US010902194B2

(12) United States Patent
Toronto et al.

(10) Patent No.: US 10,902,194 B2
(45) Date of Patent: Jan. 26, 2021

(54) NATIVELY HANDLING APPROXIMATE VALUES IN SPREADSHEET APPLICATIONS

(71) Applicant: Microsoft Technology Licensing, LLC, Redmond, WA (US)

(72) Inventors: Neil Blunt Toronto, Cambridge (GB); Advait Sarkar, Cambridge (GB); Christian Mendel Canton, Bellevue, WA (US); Andrew Donald Gordon, Cambridge (GB); Benjamin Edward Rampson, Woodinville, WA (US); Johnny Campbell, Woodinville, WA (US); Anusha Iyer, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 16/005,469

(22) Filed: Jun. 11, 2018

(65) Prior Publication Data

US 2019/0251158 A1    Aug. 15, 2019

Related U.S. Application Data

(60) Provisional application No. 62/628,553, filed on Feb. 9, 2018.

(51) Int. Cl.
*G06F 40/18* (2020.01)
*G06F 3/0484* (2013.01)
(Continued)

(52) U.S. Cl.
CPC .......... *G06F 40/18* (2020.01); *G06F 3/04847* (2013.01); *G06Q 10/06* (2013.01); *G06Q 10/10* (2013.01); *G06Q 30/02* (2013.01)

(58) Field of Classification Search
CPC ...... G06F 17/246; G06Q 10/06; G06Q 10/10; G06Q 30/02; G09B 7/09
See application file for complete search history.

(56) References Cited

U.S. PATENT DOCUMENTS

| 5,148,365 A | 9/1992 | Dembo |
| 5,381,517 A * | 1/1995 | Thorndike .............. G06F 40/18 706/52 |

(Continued)

OTHER PUBLICATIONS

Arumugam, et al., "MCDB-R: Risk analysis in the database", In Proceedings of the 36th International Conference on Very Large Data Bases, vol. 3, No. 1, Sep. 13, 2010, 12 pages.

(Continued)

*Primary Examiner* — Quoc A Tran

(57) ABSTRACT

Technology is disclosed herein for handing approximate (or uncertain) values in spreadsheet applications. More specifically, the technology describes spreadsheet applications that support arrays or sets of approximate (or uncertain) values as native entities. An approximate (or uncertain) value may be the value of a cell of the spreadsheet that is resolvable by formula, charts and other functionalities. In some implementations, approximate values may include a range of data and a probability distribution that can be automatically created by the spreadsheet application, generated based on context, input by the user, etc. Because the approximate (or uncertain) value is natively available, it can be incorporated in a spreadsheet like other values. Additionally, the approximate (or uncertain) values can automatically propagate through a spreadsheet calculation to obtain a final approximate result. The techniques also describe various ways to represent uncertain values in cells and to visualize the probability distribution.

20 Claims, 21 Drawing Sheets

(51) Int. Cl.
  *G06Q 10/06* (2012.01)
  *G06Q 30/02* (2012.01)
  *G06Q 10/10* (2012.01)
  *G06F 17/00* (2019.01)

(56) References Cited

U.S. PATENT DOCUMENTS

| | | | | |
|---|---|---|---|---|
| 5,600,584 | A | * | 2/1997 | Schlafly ............ G06F 7/483 708/551 |
| 8,255,332 | B1 | | 8/2012 | Savage |
| 8,396,777 | B1 | | 3/2013 | Fine et al. |
| 9,235,846 | B2 | | 1/2016 | Petschulat et al. |
| 9,665,554 | B2 | | 5/2017 | Ludwig |
| 9,772,759 | B2 | | 9/2017 | Hogan |
| 2007/0179982 | A1 | | 8/2007 | Spangler |
| 2009/0119137 | A1 | * | 5/2009 | Benad ............ G06Q 10/00 705/7.11 |
| 2009/0160861 | A1 | | 6/2009 | Nakano |
| 2010/0269061 | A1 | | 10/2010 | Cantor et al. |
| 2012/0179956 | A1 | | 7/2012 | Winterstein |

OTHER PUBLICATIONS

"International Search Report and Written Opinion Issued in PCT Application No. PCT/US2019/015492", dated Jun. 25, 2019, 23 Pages.

"Argo—Wiki", Retrieved From: https://github.com/boozallen/argo/wiki, Apr. 17, 2017, 24 Pages.

"Oracle Crystal Ball Compatibility Release Matrix", Retreived From: http://www.oracle.com/technetwork/middleware/crystalball/downloads/crystalballcompatibilitymatrix-2196029.xls, May 11, 2017, 8 Pages.

"Oracle Crystal Ball~ Fusion Edition~ User's guide", Retrieved From: https://docs.oracle.com/cd/E36352_01/epm.1112/cb_user.pdf, Nov. 2, 2010, 74 Pages.

Oraclecrystalball: "Tour of the Crystal Ball Ribbon and Basic Monte Carlo Simulation", Retrieved From: https://www.youtube.comjwatch?v=nuxuFtkmLQc, Apr. 6, 2012, 10 Pages.

"Invitation To Pay Additional Fees Application No. PCT/US19/015492", dated May 3, 2019, 20 Pages.

* cited by examiner

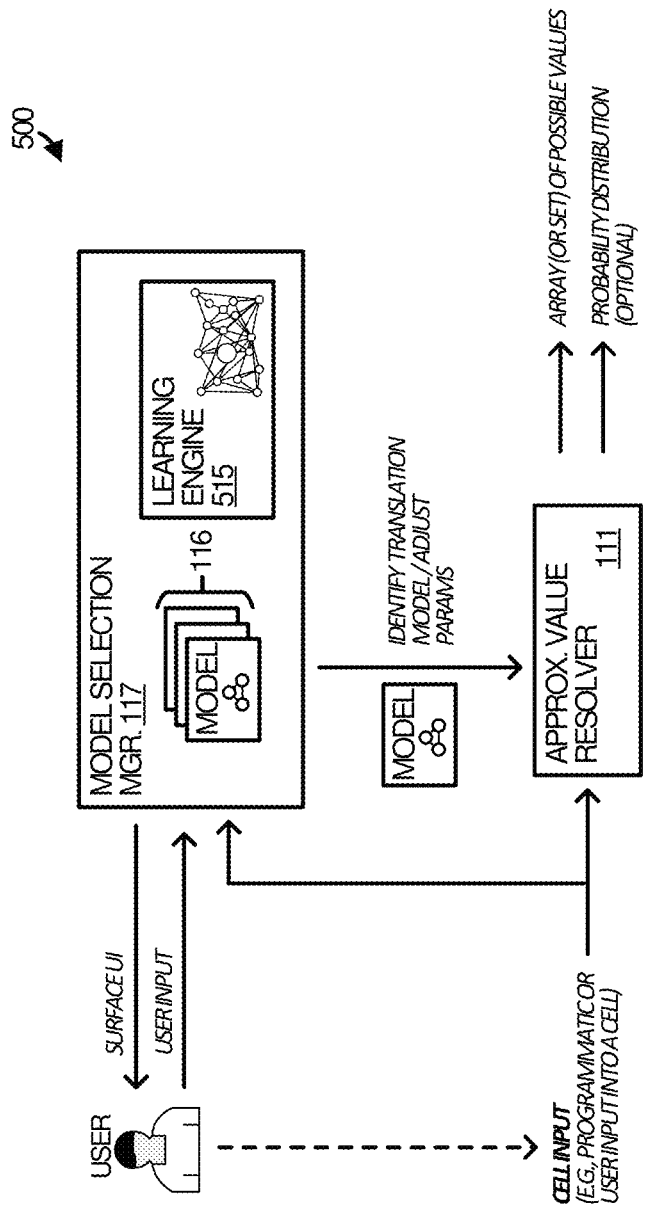

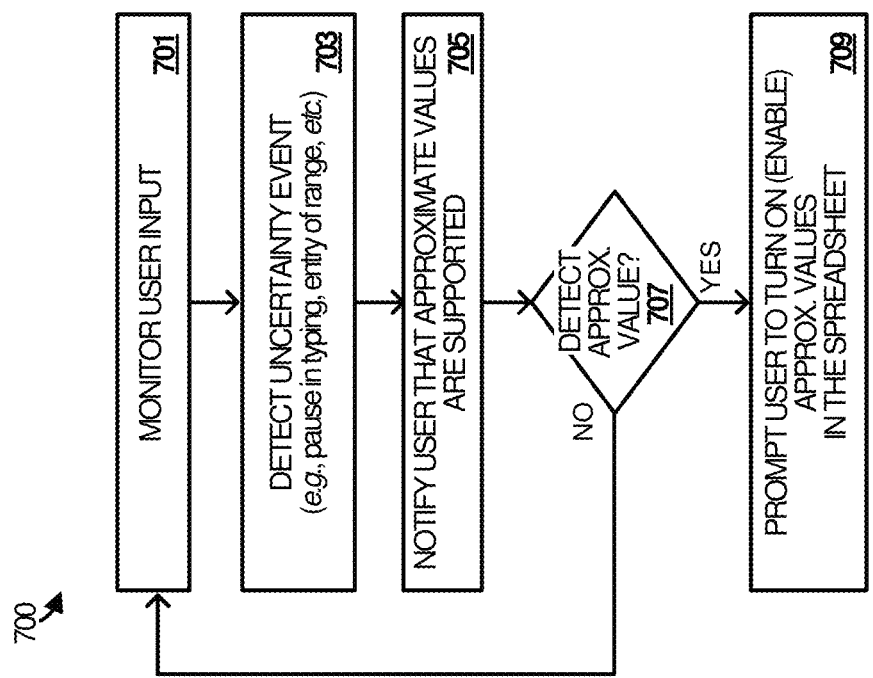

|   | A | B | C | D | E | F | G |
|---|---|---|---|---|---|---|---|
| 1 |   |   |   |   | Budget for Jan 2018 |   |   |
| 2 |   |   |   |   |   |   |   |
| 3 |   |   |   |   | Income | 2000 |   |
| 4 |   |   |   |   |   |   |   |
| 5 |   |   |   |   | Expenses |   |   |
| 6 |   |   |   |   | Rent | 1100 |   |
| 7 |   |   |   |   | Commute | 85 |   |
| 8 |   |   |   |   | Sofa! | 700 |   |
| 9 |   |   |   |   | Utilities |   |   |
| 10 |   |   |   |   | Total expenses | 1885 |   |
| 11 |   |   |   |   |   |   |   |
| 12 |   |   |   |   | Balance | 115 |   |

Unsure? You can enter a range, *e.g.*, 20-25 — 815

Budget for Jan 2018

| | A | B | C | D | E | F |
|---|---|---|---|---|---|---|
| 1 | | | | | | |
| 2 | | | | | Budget for Jan 2018 | |
| 3 | | | | | Income | 2000 |
| 4 | | | | | | |
| 5 | | | | | Expenses | |
| 6 | | | | | Rent | 1100 |
| 7 | | | | | Commute | 85 |
| 8 | | | | | Sofa! | 700 |
| 9 | | | | | Utilities | 60-120 |
| 10 | | | | | Total expenses | 1885 |
| 11 | | | | | Balance | 115 |
| 12 | | | | | | |

Turn on Estimates?
Excel will treat the cell as having a range of values.

[ No ] [ Yes ]

| | A | B | C | D | E | F | G |
|---|---|---|---|---|---|---|---|
| 1 | Compound Variable Interest | | | | | | |
| 2 | | | | | | | |
| 3 | Month | | Capital | | APR | | Interest |
| 4 | 1 | | $1,000.00 | | 0.1 (mid)<br>0.02..0.18 (95%) | | 8.27 (mid)<br>1.77..14.78 (95%) |
| 5 | 2 | | 1008.27 (mid)<br>1001.77..1014.78 (95%) | | 0.1 (mid)<br>0.02..0.18 (95%) | | 8.39 (mid)<br>1.88..15.04 (95%) |
| 6 | 3 | | 1016.73 (mid)<br>1007.3..1026.12 (95%) | | 0.1 (mid)<br>0.02..0.18 (95%) | | 8.49 (mid)<br>1.92..15.19 (95%) |
| 7 | 4 | | 1025.23 (mid)<br>1013.55..1036.9 (95%) | | 0.1 (mid)<br>0.02..0.18 (95%) | | 8.53 (mid)<br>1.86..15.32 (95%) |
| 8 | Total | | 1033.67 (mid)<br>1019.92..1047.46 (95%) | | | | |

FIGURE 13

NATIVELY HANDLING APPROXIMATE VALUES IN SPREADSHEET APPLICATIONS

CROSS REFERENCE TO RELATED APPLICATIONS

This claims priority to and benefit from U.S. Provisional Patent Application Ser. No. 62/628,553, filed on Feb. 9, 2018, titled "Natively Handling Approximate Values in Spreadsheet Applications," the contents of which are expressly incorporated by reference herein.

BACKGROUND

Spreadsheet applications such as, for example, Microsoft Excel®, are widely used in many fields and are increasingly important for analyzing data in today's business and computing environments. For example, data analysts use spreadsheet applications as tools for performing spreadsheet tasks including, but not limited to, consolidating and massaging data, producing charts, performing complex calculations, and the like.

Data input into spreadsheets for analysis often includes some uncertainty. In some instances, it is possible to account for this uncertainty by creating and running multiple calculations with all or a specific set of possible values. However, accounting for uncertainty in this manner requires reproducing a grid-based spreadsheet (or spreadsheet grid) for each possible variation of inputs. Unfortunately, reproducing the spreadsheet grids increases complexity exponentially with the number of uncertain variables. For example, creating and maintaining the various spreadsheet grids can be extremely burdensome and increase the chances of introducing errors. Moreover, running the spreadsheet calculations on each grid can be both memory intensive and time consuming.

Overall, the examples herein of some prior or related systems and their associated limitations are intended to be illustrative and not exclusive. Upon reading the following, other limitations of existing or prior systems will become apparent to those of skill in the art.

BRIEF SUMMARY

Examples discussed herein relate to natively handling approximate values in spreadsheet application, e.g., Microsoft Excel®. In an implementation, a method of operating a spreadsheet application to support arrays or sets of approximate (or uncertain) values as native entities is disclosed. The method includes receiving input for a value of a cell of a grid-based spreadsheet and an indication that the input represents an approximate value, determining that the input represents an approximate value, identifying a translation model with which to resolve the approximate value, and translating the approximate value into a set of possible values representative of the approximate value using the translation model. The method further includes replacing the value of the cell of the grid-based spreadsheet with the set of possible values.

Embodiments of the present invention also include computer-readable storage media containing sets of instructions to cause one or more processors to perform the methods, variations of the methods, and other operations described herein.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 depicts a block diagram illustrating example operations of one or more components of an approximate value handling component, according to some implementations.

FIG. 7 depicts a flow diagram illustrating example operations of one or more components of a spreadsheet application, according to some implementations.

FIG. 8 illustrates an example notification that is rendered on the surface of spreadsheet in response to the uncertainty event, according to some implementations.

FIG. 9 illustrates the spreadsheet application where approximate (or uncertain) values are not enabled, according to some implementations.

FIG. 13 depicts spreadsheet including a spreadsheet calculation where graphical representations of the approximate values and a probability distribution are rendered directly in individual cells of the spreadsheet, according to some implementations.

DETAILED DESCRIPTION

Technology is disclosed herein for handing approximate (or uncertain) values in spreadsheet applications. More specifically, the technology describes spreadsheet applications that support arrays or sets of approximate (or uncertain) values as native entities. An approximate (or uncertain) value may be the value of a cell of the grid-based spreadsheet that is resolvable by formula, charts and other functionalities. In some implementations, approximate values may include a range of data and a probability distribution that can be automatically created by the spreadsheet application, generated based on context, input by the user, etc. Because the approximate (or uncertain) value is natively available, it can be incorporated in a spreadsheet like other values. Additionally, the approximate (or uncertain) values can automatically propagate through a spreadsheet calculation to obtain a final approximate result. The techniques also describe various ways to represent uncertain values in cells and to visualize the probability distribution.

In some implementations, machine learning algorithms can be used to identify data that may be deemed interesting to a user and present the data with uncertain values to the user, such as the probability that a result takes a particular value or set of values (e.g., calculating monthly cashflow with uncertain expenses and providing a probability of negative cashflow).

Various technical effects are enabled by the techniques discussed herein. For example, the techniques enable users to account for uncertainty in cells without reproducing a spreadsheet grid for each possible variation of inputs. This makes the spreadsheet more manageable, increases the calculation speed and reduces memory requirements. Additionally, the techniques enable users to: express uncertainty in spreadsheet cells, use a set of built-in models to define uncertain values or supply their own, use guided experiences to select and create appropriate models for data, including creating models using past data, visualize and interact with uncertain values, allowing exploration of results and assisting comprehension, and extract key values related to an uncertain value to the grid and calculations. Examples of uncertain values can include, but are not limited to budget items, arrival times, durations, customer demand for items, prices, interest or exchange rates, and so on.

There are various alternative representations of uncertainty. However, the description is primarily directed to sets of possible values or Stochastic information packets (SIPs). The general terms "uncertain value", "estimate", and "approximate value", are generally used herein to refer to the same thing.

Figure 1A:
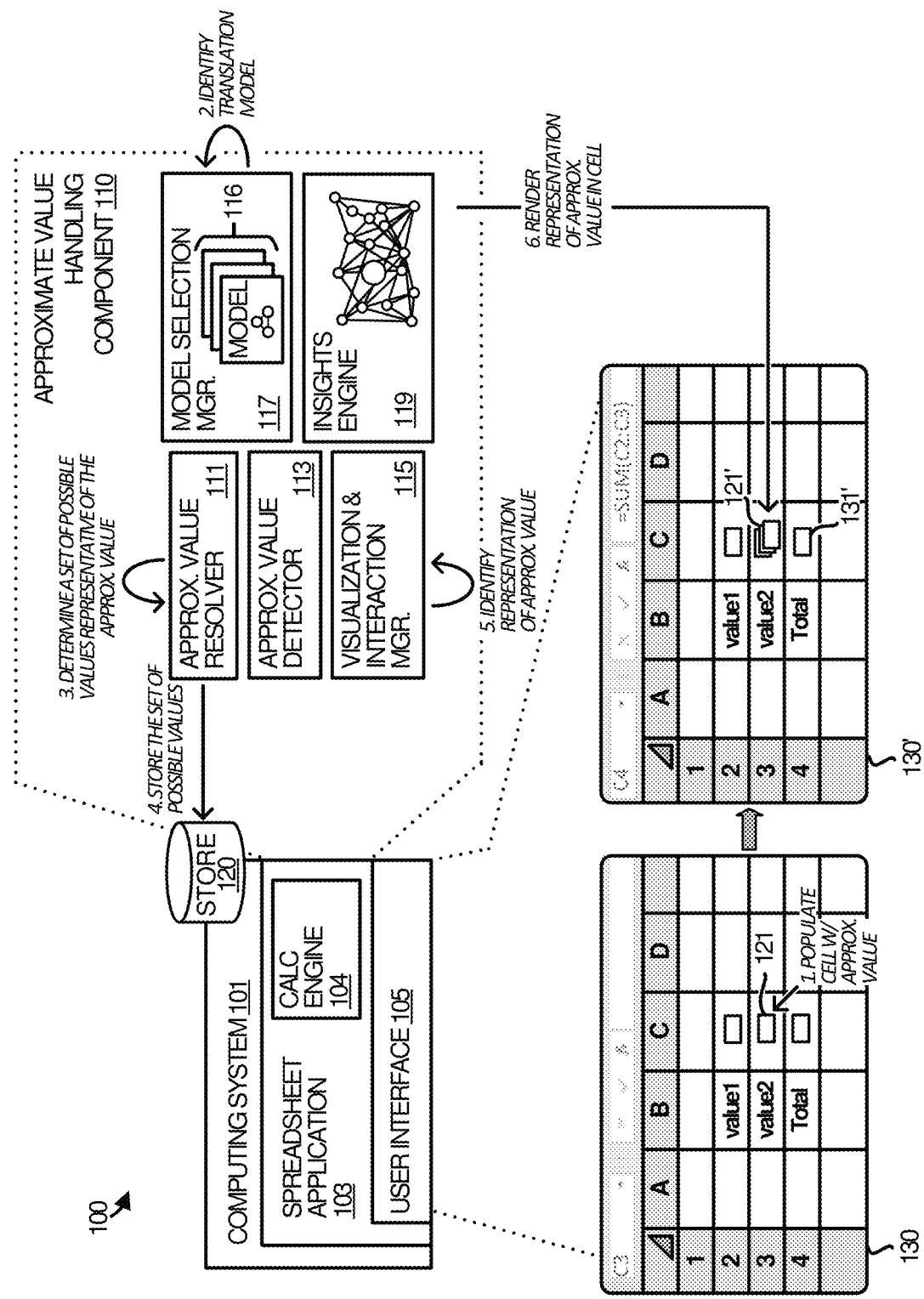
FIGS. 1A, 1B and 1C depict block diagrams illustrating an example operational architecture for handing approximate values in spreadsheet applications, according to some implementations.
Figure 1B:
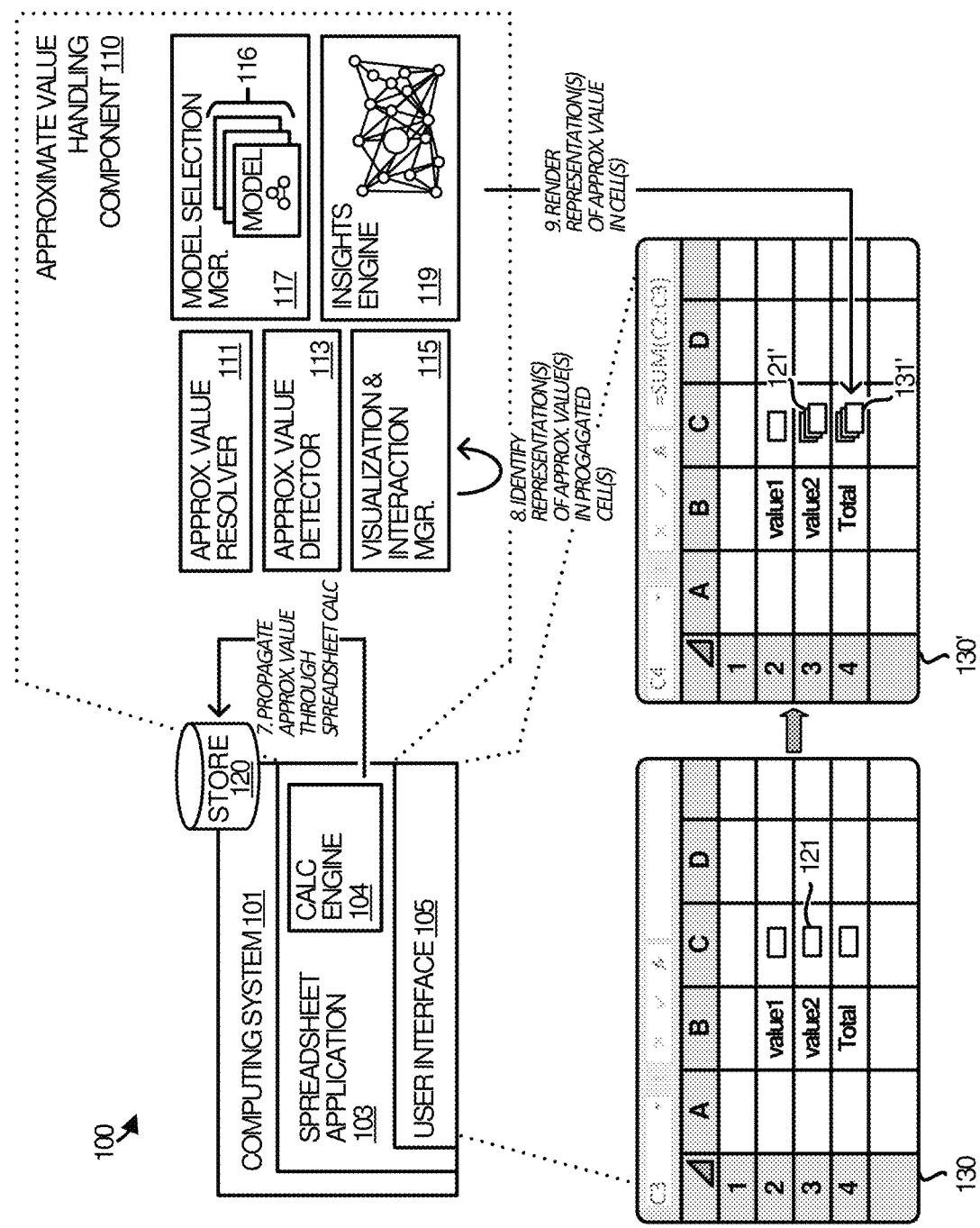
Figure 1C:
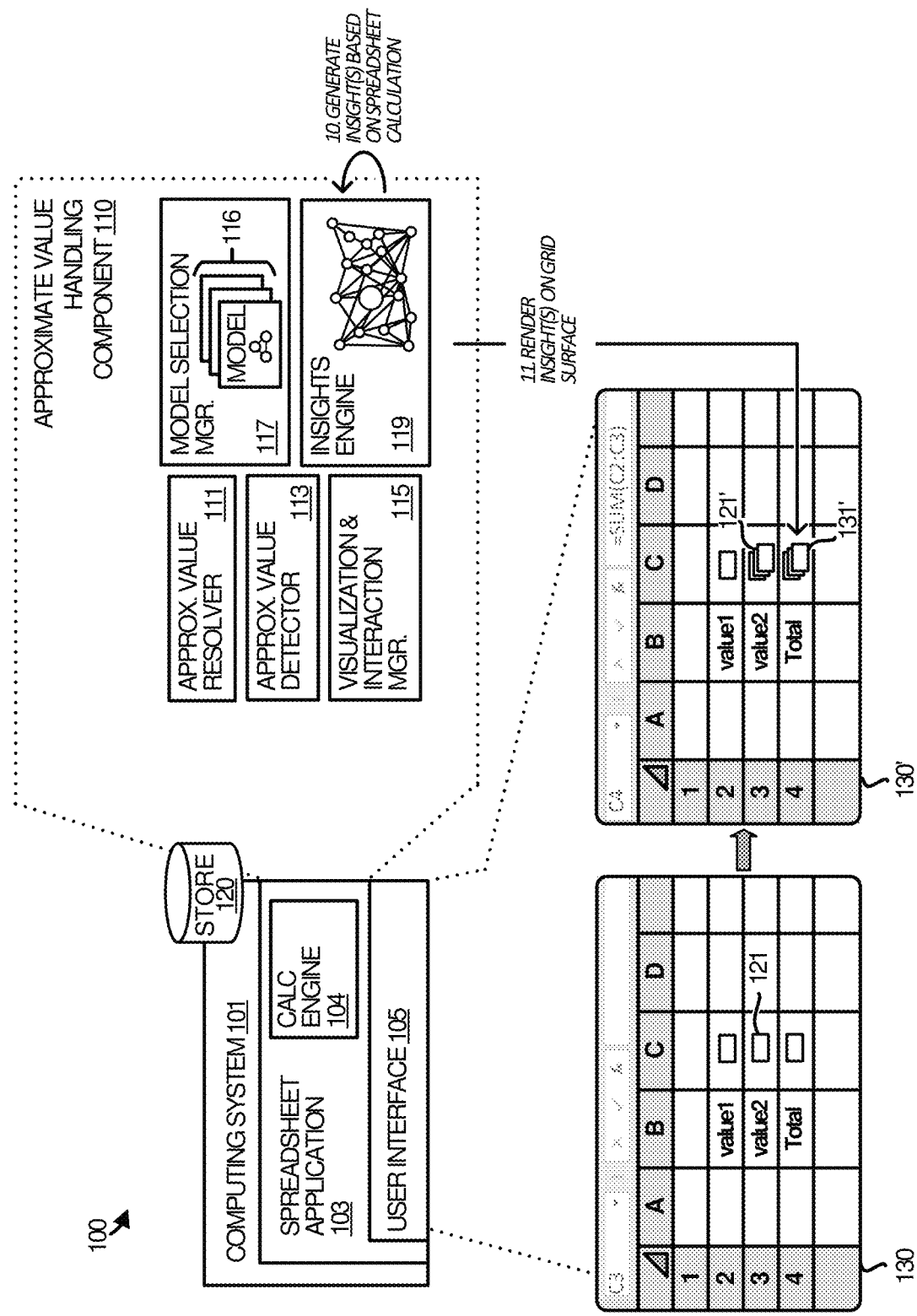

FIGS. 1A-1C depict block diagrams illustrating an example operational architecture 100 for handing approximate values in spreadsheet applications, according to some implementations. The operational architecture 100 includes a computing system 101 on which a spreadsheet application 103 may be implemented and a data store 120 on which the spreadsheet application 103 and data contained therein is stored.

Figure 18:
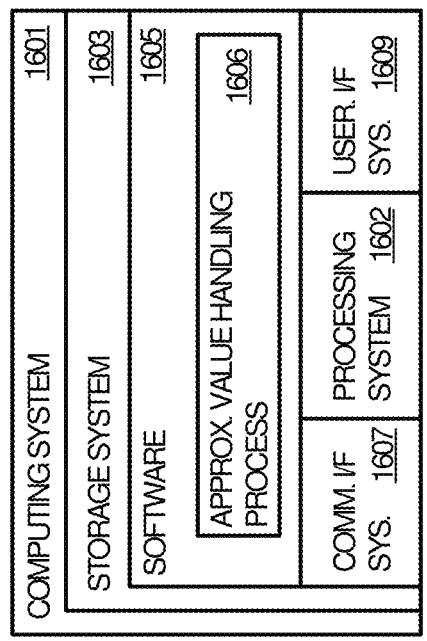
FIG. 18 is a block diagram illustrating a computing system suitable for implementing the technology disclosed herein, including any of the applications, architectures, elements, processes, and operational scenarios and sequences illustrated in the Figures and discussed below in the Technical Disclosure.

The spreadsheet application 103 can include functionality including GUIs (graphical user interface) running on computing system 101, e.g., a PC, mobile phone device, a Web server, or other application servers. Such systems may employ one or more virtual machines, containers, or any other type of virtual computing resource in the context of supporting remote micro-services as native functions within the spreadsheet application 103 of which the computing system 1801 of FIG. 18 is representative. The spreadsheet application 103 includes a calculation engine 104 and an approximate value handling component 110. The approximate value handling component 110 can assist with driving a user interface 105 to the spreadsheet application 103. As shown in the example of FIGS. 1A-1C, the user interface 105 depicts a spreadsheet grid 130.

The approximate value handling component 110 includes an approximate value resolver 111, an approximate value detector 113, a visualization and interaction manager 115, a model selection manager 117, and an insights engine 119. The functions represented by the managers, modules and/or engines can be implemented individually or in any combination thereof, partially or wholly, in hardware, software, or a combination of hardware and software. Although shown as being included within the approximate value handling component 110, one or more of these components can alternatively or additionally be included within the calculation engine 104.

The approximate value resolver 111 is configured to generate, determine and/or identify an array or set of possible values representative of an approximate value using a translation model. As discussed in more detail below with reference to FIG. 5, the approximate value resolver 111 can also determine, based at least in part on the translation model, a probability distribution associated with the set of possible values representative of the approximate value.

The approximate value detector 113 is configured to monitor user interaction with the spreadsheet and detect uncertainty events related to one or more cells of the spreadsheet based on the user interaction. For example, the approximate value detector 113 can detect a pause (or hesitation) in user interactions with a spreadsheet calculation and responsively direct the visualization and interaction manager 115 to surface a notification indicating that approximate values are supported or an interface allowing the user to enable approximate values. Example operation of the approximate value detector 113 is shown and discussed in greater detail with reference to FIGS. 7-9.

The visualization and interaction manager 115 is configured to identify appropriate representations of approximate values and/or graphical user interfaces and render those representations and/or interface in cells or on a surface of the spreadsheet. In some instances, the interfaces are interactive allowing users of the spreadsheet to, for example, adjust the approximate value or to select or modify a distribution type or parameters of a translation model associated with the distribution type.

The model selection manager 117 is configured to identify and select a translation model for evaluating (or resolving) an approximate value. In some implementations, models can be selected, at least in part, based on guided experiences (e.g., historical data). The historical data can be aggregated from many users. Alternatively or additionally, user profiles can be developed by recognizing types of spreadsheet calculations and/or surfacing questions to users.

The insights engine 119 is configured to automatically generate an insight or recommendation based on one or more approximate values of a spreadsheet calculation. In some implementations, insights engine 119 directs the visualization and interaction manager 115 to render the insight or recommendation on the surface of the spreadsheet via a graphical user interface. An example insight (or recommendation) is shown and discussed in greater detail with reference to FIG. 12. In some implementations, the insights engine 119 leverages user profiles and/or past actions and similar users' selections to learn and identify types of insights that best fit a particular data/distribution.

Referring first to FIG. 1A, in one example of operation, one or more components of the spreadsheet application 103 populate a cell C3 of a grid 130 with an approximate (or uncertain) value 121 (step 1). As discussed herein, the approximate value 121 can be received by the spreadsheet application 103 in a number of ways, e.g., via user input, programmatic input, etc. Various examples illustrating user input of approximate values including selecting or adjusting approximate value distribution types or parameters associated with the distribution types are shown and discussed in greater detail with reference to FIGS. 6A-6C.

One or more components of the approximate value handling component 110 detect the approximate value in cell C3 of the grid 130 and the model selection manager 117 responsively identifies a translation model with which to evaluate the approximate value (step 2). The approximate value resolver then determines or generates a set of possible values, e.g., an array, using the identified translation model (step 3). In some implementations, the translation can also include determining or generating probability distribution information based, at least in part, on the translation model. The probability distribution type and/or parameters can be edited via a user interface that is rendered on the surface of the spreadsheet (see, e.g., FIG. 6C). The set of possible values and the probability distribution information (optionally) are stored in a data store (or database) 120 (step 4).

The visualization and interaction manager 115 then identifies a representation for the approximate value (step 5). In some implementations, the visualization and interaction manager 115 may identify at least one possible value (e.g., most likely value) of the set of possible values representative of the approximate value and select a visual representation, based at least in part, on the at least one possible value. The visualization and interaction manager 115 can then render, in the cell of grid 130' of the spreadsheet, the representation for the approximate value 121'. In some implementations, the representation for the approximate value 121' includes an indication that the at least one possible value represents an approximate value for the cell (step 6). Various example visual representations of approximate values are shown and discussed in greater detail with reference to FIG. 15.

FIG. 1B illustrates propagation of the approximate (or uncertain) value 121' through a spreadsheet calculation. As discussed herein, the approximate (or uncertain) value 121' can automatically propagate downstream through the spreadsheet calculation without requiring a recalculation of the entire sheet or grid (step 7).

In some implementations, the approximate (or uncertain) values are propagated through a spreadsheet calculation by the calculation engine 104. The spreadsheet application can include an approximate (or uncertain) data type which can represent an array or set of possible values, e.g., a SIP. In some implementations, a global parameter N or some other variable governs the size of arrays.

Various mechanisms can be included to propagate approximate value representations through a spreadsheet. For example, spreadsheet application 103 can extend formula evaluation by overloading operators, worksheet functions, and other constructs. These concepts are shown and discussed in greater detail with reference to FIGS. 4A and 4B.

In some implementations, a quick calculation mode can be utilized with a single value or a subset of the set of possible values representative of the approximate value propagated downstream through the spreadsheet calculation in order to complete the calculation more quickly. The remaining values or samples are then propagated through the spreadsheet calculation at a later time.

In some implementations, the spreadsheet application 103 can estimate a cost to propagate the approximate value downstream through a spreadsheet calculation. The estimate can be performed with or without the quick calculation mode and, assuming the quick calculation mode is used, the estimate can be performed before and/or after the quick calculation to estimate the cost of the quick calculation in addition to calculation of the remaining values or samples.

Once one or more of the set of possible values representative of the approximate (or uncertain) value 121' are propagated through the spreadsheet calculation, the visualization and interaction manager 115 can then identify a representation for each of the propagated approximate values (step 8), and render, in the appropriate cells, the propagated approximate values (step 9).

FIG. 1C illustrates automatic generation of one or more insights based, at least in part, on the spreadsheet application. As discussed above, the insights engine 119 automatically generates an insight or recommendation based on one or more approximate values of a spreadsheet calculation (step 10). The visualization and interaction manager 115 then renders the insight or recommendation on the surface of the spreadsheet via a graphical user interface (step 11).

Figure 2:
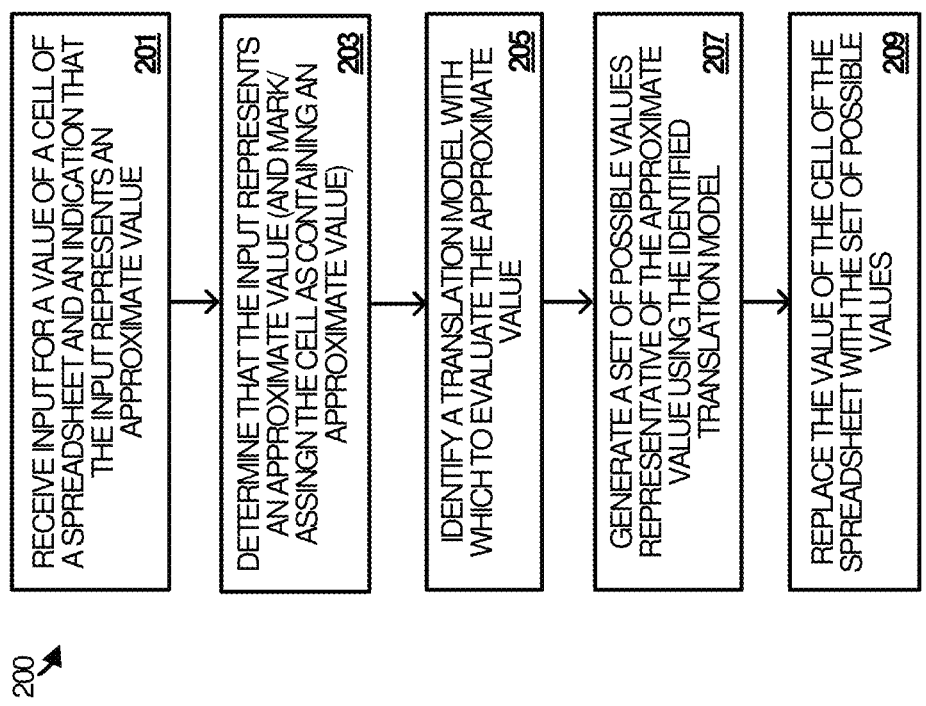
FIG. 2 depicts a flow diagram illustrating example operations of one or more components of a spreadsheet application, according to some implementations.

FIG. 2 depicts flow diagram 200 illustrating example operations of one or more components of a spreadsheet application, according to some implementations. More specifically, flow diagram 200 illustrates example operations for replacing an approximate value in a cell of a spreadsheet with an array or set of possible values representative of the approximate value. The spreadsheet application may be spreadsheet application 103 of FIG. 1, although alternative configurations are possible. The example operations may be performed in various implementations by the approximate value handling component 110 of FIG. 1, or one or more processors, extensions, modules, engines, components or tools associated therewith.

To begin, at 201, the approximate value handling component receives input for a value of a cell of a spreadsheet and an indication that the input represents an approximate value. At 203, the approximate value handling component identifies or determines that the input represents an approximate value. At 205, the approximate value handling component identifies a translation model with which to resolve the approximate value.

At 207, the approximate value handling component translates the approximate value into a set of possible values representative of the approximate value using the translation model. Lastly, at 209, the approximate value handling component replaces the value of the cell of the spreadsheet with the set of possible values.

Figure 3:
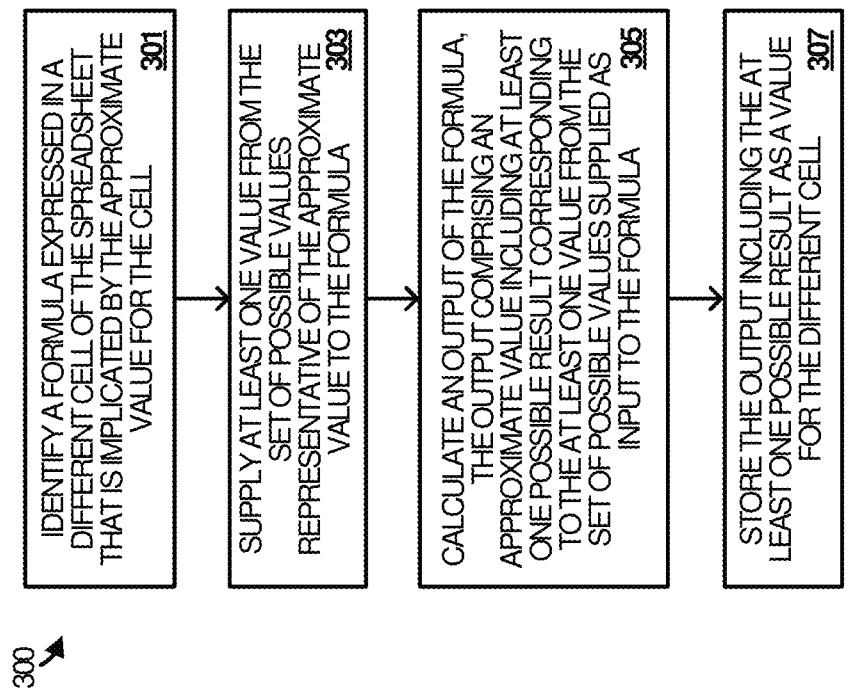
FIG. 3 depicts a flow diagram illustrating additional example operations of one or more components of a spreadsheet application, according to some implementations.

FIG. 3 depicts flow diagram 300 illustrating example operations of one or more components of a spreadsheet application, according to some implementations. More specifically, flow diagram 300 illustrates example operations for propagating an approximate value through a next formula of a spreadsheet calculation. The spreadsheet application may be spreadsheet application 103 of FIG. 1, although alternative configurations are possible. The example operations may be performed in various implementations by the approximate value handling component 110 of FIG. 1, or one or more processors, extensions, modules, engines, components or tools associated therewith.

To begin, at 301, the approximate value handling component identifies a formula expressed in a different (downstream) cell of the spreadsheet calculation that depends on the approximate value. At 303, the approximate value handling component supplies the set of possible values representative of the approximate value as an input to the formula. At 305, the approximate value handling component calculates an output of the formula as a value of the different cell of the spreadsheet. The output comprises a different set of possible values representative of a different approximate value. Example output calculation are shown and discussed in greater detail with reference to FIG. 3. Lastly, at 307, the approximate value handling component stores the different set of possible values as a value of the different cell of the spreadsheet.

Figure 4A:
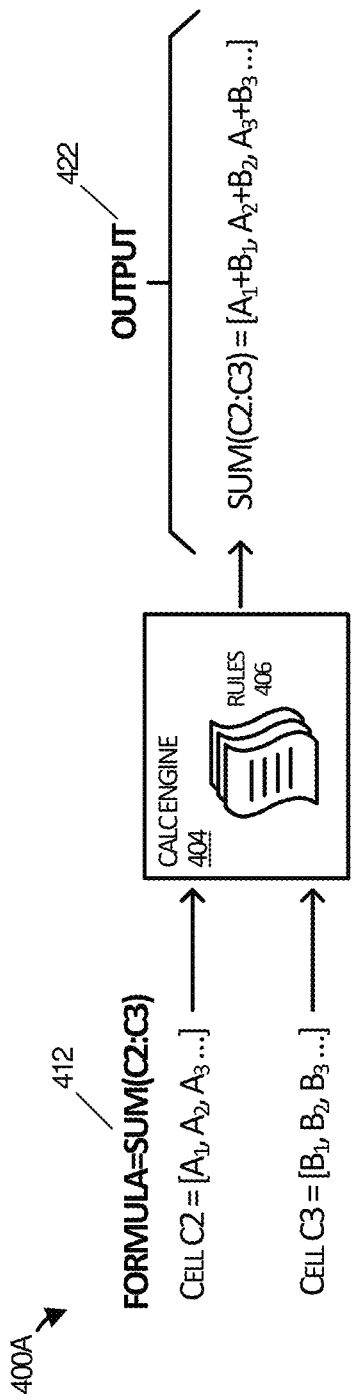
FIGS. 4A and 4B depict block diagrams illustrating an example calculation engine capable of handling formulas that include approximate values, according to some implementations.
Figure 4B:
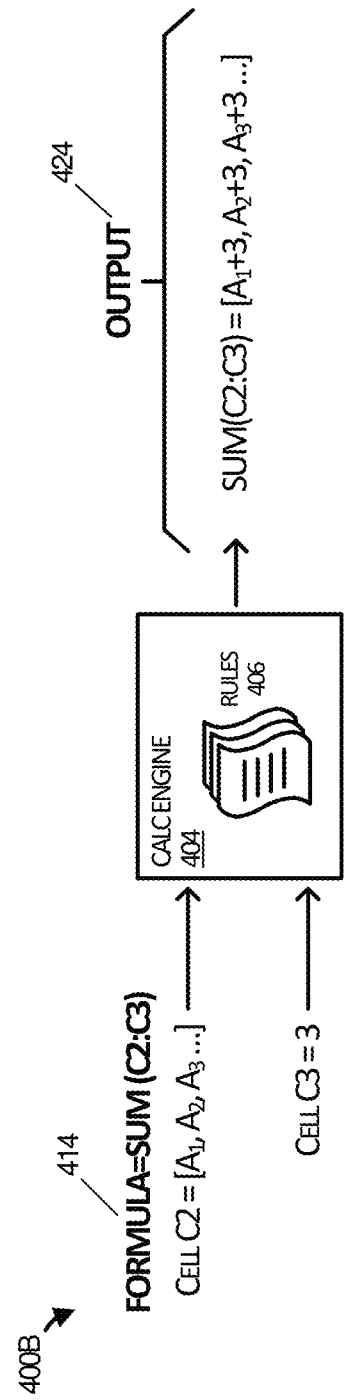

FIGS. 4A and 4B depict block diagrams 400A and 400B, respectively, illustrating an example calculation engine 404 capable of handling formula calculation approximate values in spreadsheet applications, according to some implementations. More specifically, the calculation engine 404 includes rules 406 that facilitate the handling (or overloading) of formulas in the spreadsheet calculations that have one or more inputs that are arrays or sets of possible values representative of an approximate value. The calculation engine 404 can be calculation engine 104 of FIG. 1, although alternative configurations are possible.

As discussed herein, to propagate approximate value representations through a spreadsheet, the spreadsheet application can extend formula evaluation by overloading operators, worksheet functions, and other constructs. In the examples of FIGS. 4A and 4B, the rules 406 provide context on how to extend these formulas.

Referring first to FIG. 4A, the calculation engine 404 identifies a formula 412 expressed in a cell of a spreadsheet that sums the set of approximate values in cells C2 and C3 using the SUM function defined in the spreadsheet application. As shown, the cells C2 and C3 each contain an array or set of possible values representative of an approximate value. The calculation engine 404 first detects that the formula 412 has one or more approximate value inputs and then accesses the rules 406 to determine how the SUM function has been overloaded. In the example of FIG. 4A, the rules 406 indicate that two arrays should be summed in a piecewise manner. Accordingly, the approximate value output 422 is a piecewise addition of the arrays stored in cells C2 and C3.

Conversely, as shown in the example of FIG. 4B, rules 406 indicate that a constant value should be summed with each value of an array. The calculation engine 404 first detects that the formula 414 has one or more approximate value inputs and then accesses the rules 406 to determine how the SUM function has been overloaded. In the example of FIG. 4B, the rules 406 indicate that a constant value should be summed with each value of an array. Accordingly, the approximate value output 424 is an addition of each value stored in cell C2 with a constant value 3 stored in cell C3.

FIG. 5 depicts a block diagram illustrating example operations of one or more components of an approximate value handling component 500, according to some implementations. More specifically, the example of FIG. 5 includes a model selection manager 117 configured to identify and select a translation model 116 for evaluating (or resolving) cell input including an approximate value using approximate value resolver 111. Some or all of the modules, engines, or components of the approximate value handling component 500 can be alternatively or additionally included in a calculation engine such as, for example, calculation engine 104 of FIG. 1.

As discussed above, the model selection manager 117 is configured to identify and select a translation model for evaluating (or resolving) an approximate value. The models can be selected, at least in part, based on guided experiences (e.g., historical data) which can be aggregated from one or many users. For example, questions can be surfaced to a user to determine which model to use or how to generate a model. In some implementations, a learning engine 515 applies machine learning algorithms to identify or build the appropriate models.

Once the model is selected, the approximate value handling component then generates, determines and/or identifies an array or set of possible values representative of an approximate value using a translation model. The approximate value handling component can also determine, based at least in part on the translation model, a probability distribution associated with the set of possible values representative of the approximate value.

Figure 6C:
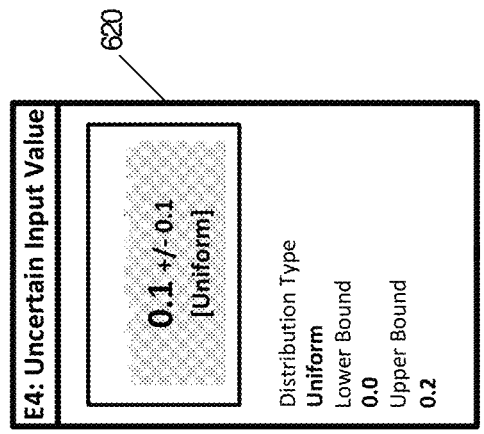
FIGS. 6A, 6B and 6C depict various example techniques for inputting approximate values into a cell of a spreadsheet, according to some implementations.
Figure 6B:
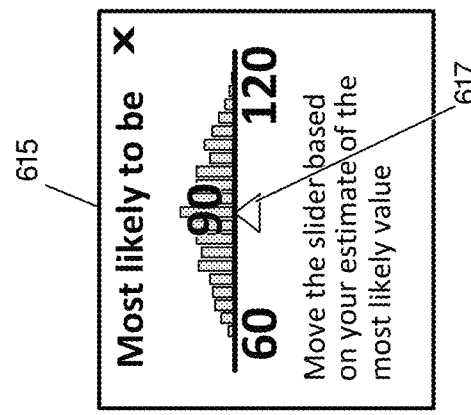
Figure 6A:
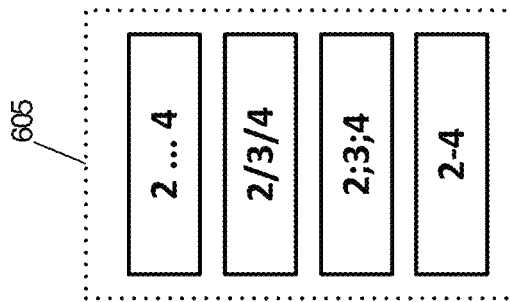

FIGS. 6A-6C depict various example techniques for inputting or varying approximate values in a cell of a spreadsheet, according to some implementations. As discussed herein, cell input (or data) representative of an approximate value can be input into (or populate) a cell of a spreadsheet by a user or via external data sources or services. Additionally, the spreadsheet application can cause visualization details of the approximate value to surface on a spreadsheet as cards, charts, or other graphical depictions.

Referring first to FIG. 6A, in some implementations, a user can input an approximate value into a cell of a spreadsheet using special textual syntax and/or notations. Notation examples 605 include a range (min ... max), e.g., "2 ... 4", or (min-max), e.g., "2-4" can be used to indicate the array or set of possible values [2, 3, 4]. Likewise, the array or set of possible values [2, 3, 4] can be indicated using syntax that identifies each value of the array separated by a delimiter, e.g., "2/3/4" or "2;3;4". In some implementations, a user can input notation indicating a range plus a most likely value (min/most-likely/max), e.g., 1/2/4. In each case, the spreadsheet application identifies an appropriate model, and/or custom parser, e.g., translation model, to evaluate or translate the cell input.

Referring next to FIG. 6B, in some implementations, a user can input an approximate value into a cell of a spreadsheet and/or adjust the approximate value using a widget

615. As shown in the example of FIG. 6B, widget 615 allows a user to set or modify parameters of an approximate value. For example, widget 615 allows a user to adjust a most likely value using slider 617. In some implementations, the widget can also facilitate adjustments to the range, e.g., min or max values, a number of samples (or step size) in the range of the approximate value, etc. An example illustrating adjusting an approximate value using a widget is shown and discussed in greater detail with reference to FIGS. 10 and 11A-11B.

In some implementations, inputting a particular notation, e.g., "~90", in a cell of a spreadsheet indicates an approximate (or uncertain) value and triggers a user interface to be surfaced such as, for example, widget 615 or card 620 (discussed with reference to FIG. 6C) to set or modify parameters of or associated with the approximate value.

Referring lastly to FIG. 6C, in some implementations, a user can input an approximate value into a cell of a spreadsheet and/or adjust the approximate value using a card 620. Surfacing of card 620 can be triggered by user interactions with the spreadsheet, e.g., by clicking a button or other user interface affordance. As noted above, parameters can be set or modified. For instance, a user can control the number of samples in array (or SIPs). The control can be in the global menu and/or contextually invoked inline (e.g., from a card). For example, if the spreadsheet application uses an array of samples of size N to represent an uncertain value, the settings would determine the actual value of N, such as N=1000 or N=10,000. These settings apply to the whole workbook, by default, but could be set differently for individual sheets.

The user can also select special modes, such as a quick calculation (calc) mode with limited samples just to help build workbooks with uncertainty, and then a full estimation mode that runs much higher samples. Alternatively, the spreadsheet can be built (propagated) lazily, initially computing N=1000, for example, but then for the purpose of display to sample more, possibly until some fixpoint is reached, e.g., when the approximate shape or a quantile gets stable. The progressive refinement/inclusion of additional samples might also be driven by user action, or automatically inferred user interest.

External data sources and/or services can also input approximate values into cells of spreadsheet applications. For example, external data sources or services may provide estimates such as a mean plus a standard deviation, a confidence interval, or a sequence of samples such as an array of values (or SIP). These data, when imported into a spreadsheet application can be represented as approximate (or uncertain) values. Similarly, machine learning algorithms such as classifiers, regressors, or the like, may return results in the form of a probability distribution, e.g., a probability or a vector (such as a simplex) or a mean plus standard deviation. These results can also be imported into the spreadsheet application as approximate (or uncertain) values.

In some implementations, the spreadsheet application can offer suitable data as a service to users. For example, data can be customized per cloud-based tenant subscribers. In another example, data from weather satellites, or on transportation arrival times, etc., can be used to build predictive models.

Additionally, in some implementations, approximate (or uncertain) values can be synthesized from existing data in a spreadsheet grid. In some instances, the spreadsheet application can apply statistical inference techniques to infer a distribution from past samples and then represent the distribution as an uncertain value. For example, a spreadsheet grid containing a column tracking grocery budget over the past year can be used to create an uncertain value that resembles these past samples, setting the appropriate range and distribution. In another example of operation, a spreadsheet grid contains utility bills for a year. The spreadsheet application can infer a distribution so as to create an uncertain value to predict a future item, such as the winter utility bill. Another example would be to predict data usage on a phone plan for a future month, based at least in part, on the past months usage. Other end-user friendly experiences can involve helping the user select the range of interest, and automatically generating a formula to be placed into a cell.

Although not shown in the examples of FIGS. 6A-6C, in some implementations, approximate (or uncertain) values and/or spreadsheet calculations including those approximate (or uncertain) values can be exportable beyond the spreadsheet application. For instance, the approximate (or uncertain) values and/or spreadsheet calculations including those approximate (or uncertain) values can be exported to databases, such as Power BI or SQL, or to an email or other form of messaging.

FIG. 7 depicts flow diagram 700 illustrating example operations of one or more components of a spreadsheet application, according to some implementations. More specifically, flow diagram 700 illustrates example operations for notifying users regarding approximate value handling capability of a spreadsheet application and, in some instances, enabling the approximate value handling capability of a spreadsheet application responsive to user input. The spreadsheet application may be spreadsheet application 103 of FIG. 1, although alternative configurations are possible. The example operations may be performed in various implementations by one or more components of the approximate value handling component 110 of FIG. 1, or one or more processors, extensions, modules, engines, components or tools associated therewith. Alternative configurations are also possible.

To begin, at 701, the spreadsheet application monitors user input or user interaction with a spreadsheet (or spreadsheet calculation). As discussed herein, a spreadsheet calculation can include one or more cells that result in a final calculation. At 703, the spreadsheet application detects an uncertainty event. An uncertainty event can be an action or series of actions taken by a user that collectively indicate one or more values of a spreadsheet calculation may contain an approximate (or uncertain) value.

In some implementations, one or more uncertainty events can be hard-coded in an approximate value detector such as, for example approximate value detector 113 of FIG. 1. Additionally, in some implementations, the approximate value detector can include a learning engine including machine learning algorithms capable of automatically learning and detecting behavior (or interaction) indicative of an uncertainty event.

As discussed herein, an uncertainty event can be triggered in any number of ways, including in ways that are learned by the spreadsheet application over time. For example, an uncertainty event can be triggered when the spreadsheet application detects: a pause or hesitation in inputting a value in a cell of a spreadsheet; repeated modifications to a value of a cell of a spreadsheet within a predetermined period of time; language indicative of uncertainty, e.g., column or row headers labeled "Estimate," "Budget," "Expected," "min/max" type language, etc., or words, notes or annotations around a cell of a spreadsheet that are indicative of uncertainty, e.g., "to be confirmed," "subject to update," "TBD," etc.; dates that occur in the future; etc.

At 705, the spreadsheet application notifies the user that approximate (or uncertain) values are supported. In some implementations, the notification can include surfacing a prompt or dialogue box. For example, FIG. 8 illustrates an example budget calculation. As shown, in the process of calculating the Total expenses and Balance, the user leaves Utilities blank as it is the middle of the month and the value is unknown. The spreadsheet application detects the user's hesitation (uncertainty event) and suggests the user enter a range or an approximate value. More specifically, example of FIG. 8 illustrates an example notification 815 that is rendered on the surface of spreadsheet 830 in response to the uncertainty event.

In some implementations, approximate (or uncertain) values can be enabled by default in a spreadsheet application. Alternatively, prompts or notifications can be rendered on the surface of the spreadsheet allowing a user to enable (or disable) support for approximate (or uncertain) values in the spreadsheet. Continuing with the example of FIG. 7, at decision 707, the spreadsheet application determines if an approximate value is detected and, if so, at 709, prompts a user to turn on (or enable) approximate (or uncertain) values in the spreadsheet. For example, FIG. 9 illustrates the spreadsheet application where approximate (or uncertain) values are not enabled. The spreadsheet application detects an approximate input, e.g., range "60-120" in a cell, and responsively prompts or renders a user prompt 915 on the surface of spreadsheet 930 allowing the user to turn on (or enable) estimates or approximate values in the spreadsheet calculation.

Figure 10:
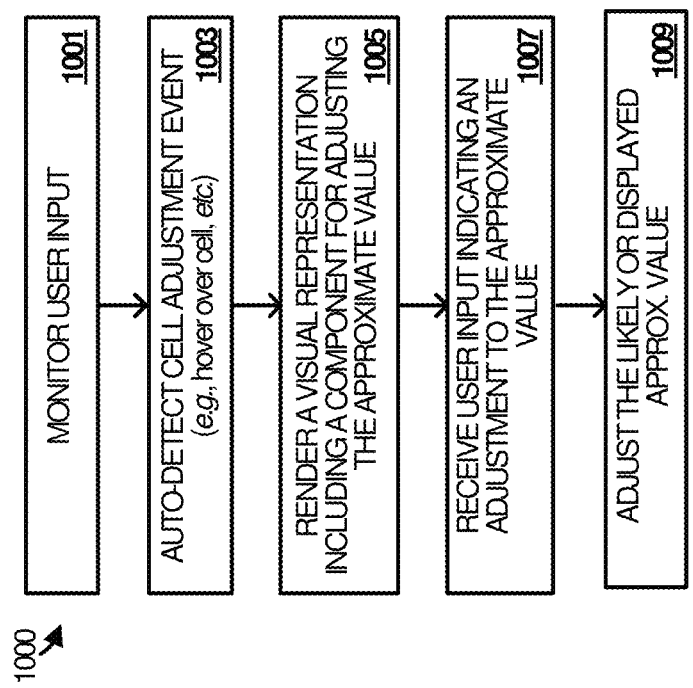
FIG. 10 depicts flow diagram illustrating example operations of one or more components of a spreadsheet application, according to some implementations.

FIG. 10 depicts flow diagram 1000 illustrating example operations of one or more components of a spreadsheet application, according to some implementations. More specifically, flow diagram 1000 illustrates example operations for dynamically surfacing a user interface to set or adjust an approximate value. The spreadsheet application may be spreadsheet application 103 of FIG. 1, although alternative configurations are possible. The example operations may be performed in various implementations by one or more components of the approximate value handling component 110 of FIG. 1, or one or more processors, extensions, modules, engines, components or tools associated therewith. Alternative configurations are also possible.

To begin, at 1001, the spreadsheet application monitors user input or user interaction with a spreadsheet. At 1003, the spreadsheet application detects an uncertainty event related to one or more cells of the spreadsheet based on the user input or interaction with the spreadsheet or those cells. An uncertainty event can be, for example, an indication that a user is hovering over a cell with an approximate value, double clicking a cell (or a corner of the cell) with an approximate value, etc.

Once the uncertainty event is detected, at 1005, the spreadsheet application renders a visual representation (or graphical user interface) on the surface of the spreadsheet. The visual representation can include a component for adjusting the approximate value. For example, FIGS. 11A and 11B illustrate a graphical interface 1115 including a slider 117 operable to allow a user to quickly adjust the approximate value of a cell.

Figure 11A:
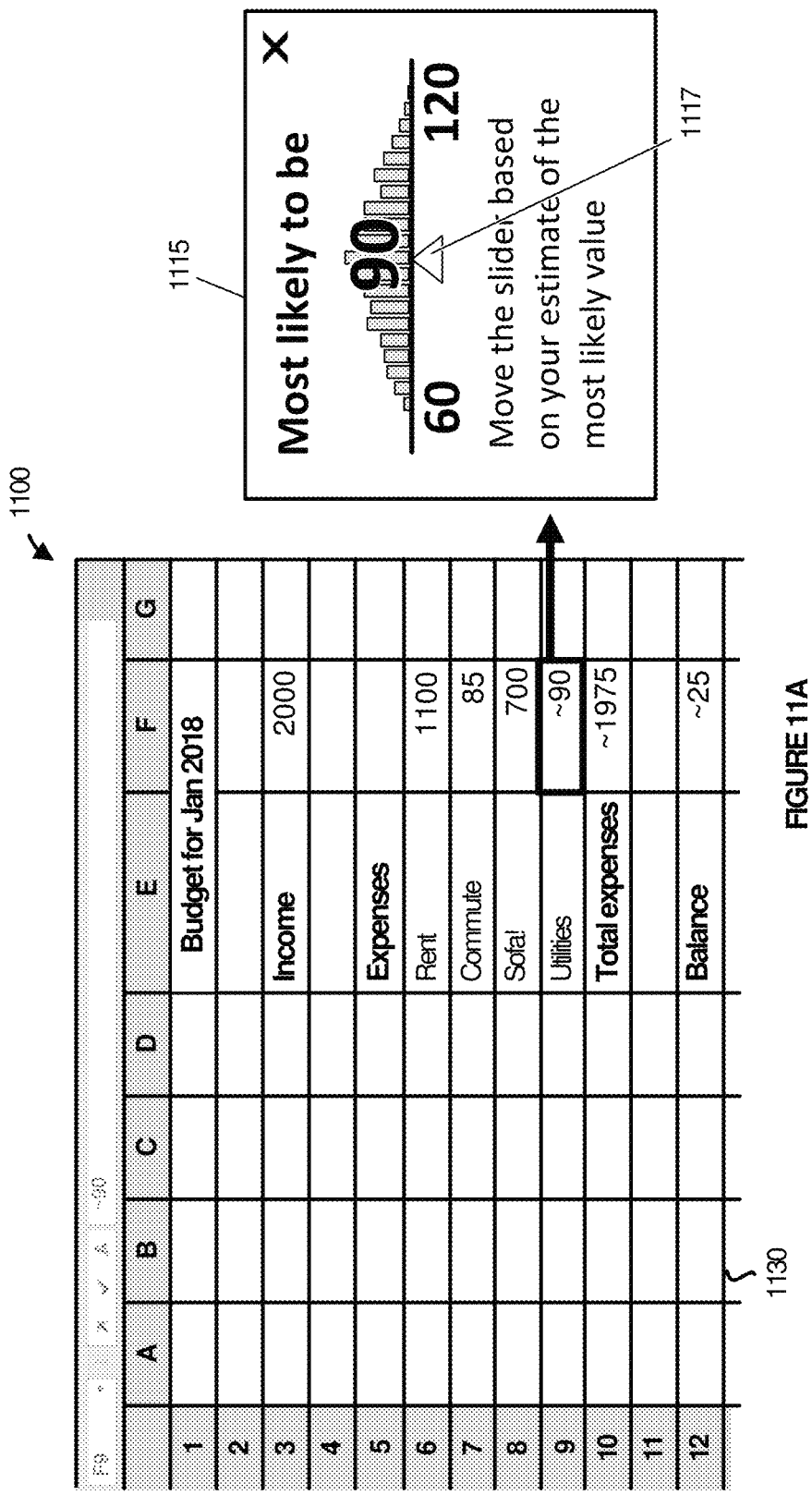
FIGS. 11A and 11B illustrate a graphical interface including a slider operable to allow a user to quickly adjust the approximate value of a cell, according to some implementations.
Figure 11B:
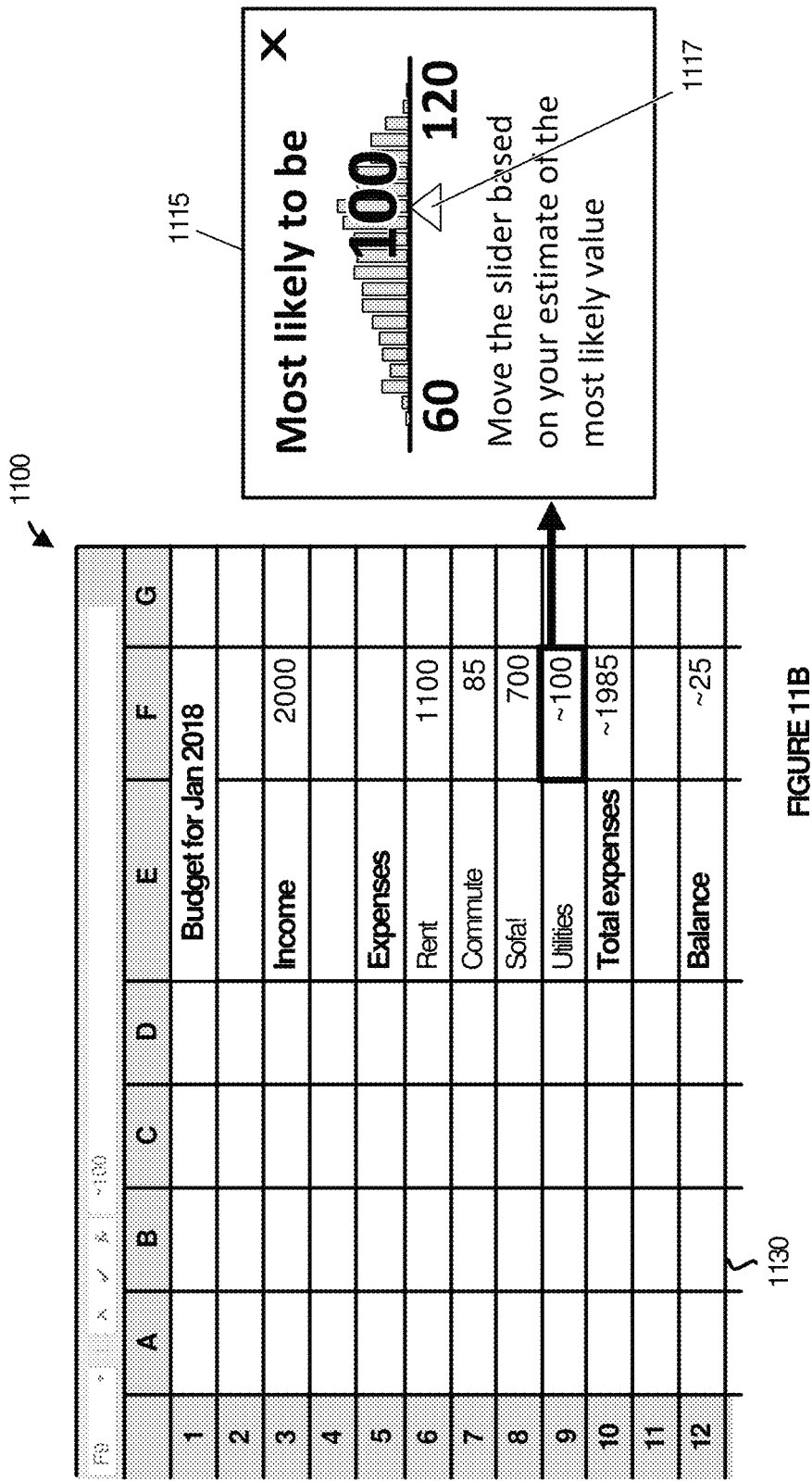

Continuing with the example budget calculation of FIG. 9, FIGS. 11A and 11B depict spreadsheet 1130 including a spreadsheet calculation representative of a budget having approximate (or uncertain) values, according to some implementations. More specifically, spreadsheet 1130 includes an approximate (or uncertain) value for category 'Utilities' in cell F9. As discussed above, the spreadsheet application can auto-detect a cell adjustment event, e.g., hover over, entry of particular syntax indicative of an approximate value "~", etc.

Referring first to FIG. 11A, for the category 'Utilities' in cell F9, the approximate value entered by the user comprises a range "60-120." A discussed herein, the spreadsheet application translates the user input of a range into a set of possible values using a translation model. In some implementations, the spreadsheet application then renders a mostly likely value and an indication that the cell represents an approximate value. As shown in the example of FIG. 11A, the spreadsheet application selects the middle of the range as the most likely value (since a most likely value is not provided) and renders the most likely value along with an indication that the value represents an approximate value, e.g., "~90."

Responsive to detection of a cell adjustment event as discussed above, the spreadsheet application renders (or prompts) the user, via a graphical interface 1115 including slider 117, to adjust the approximate value of a cell.

Referring next to FIG. 11B, because the user knows that she typically spends more than S90, she quickly adjusts the value up to S100 using slider 117. The approximate value then automatically propagates through the budget calculation, e.g., first through total expenses in cell F10 and then to the "Balance" in cell F12. Advantageously, there is no need to modify formulas or maintain multiple spreadsheet grids to perform and propagate this calculation. Additionally, the modified approximate value is only propagated downstream reducing the computational costs endured by the spreadsheet application.

Figure 12:
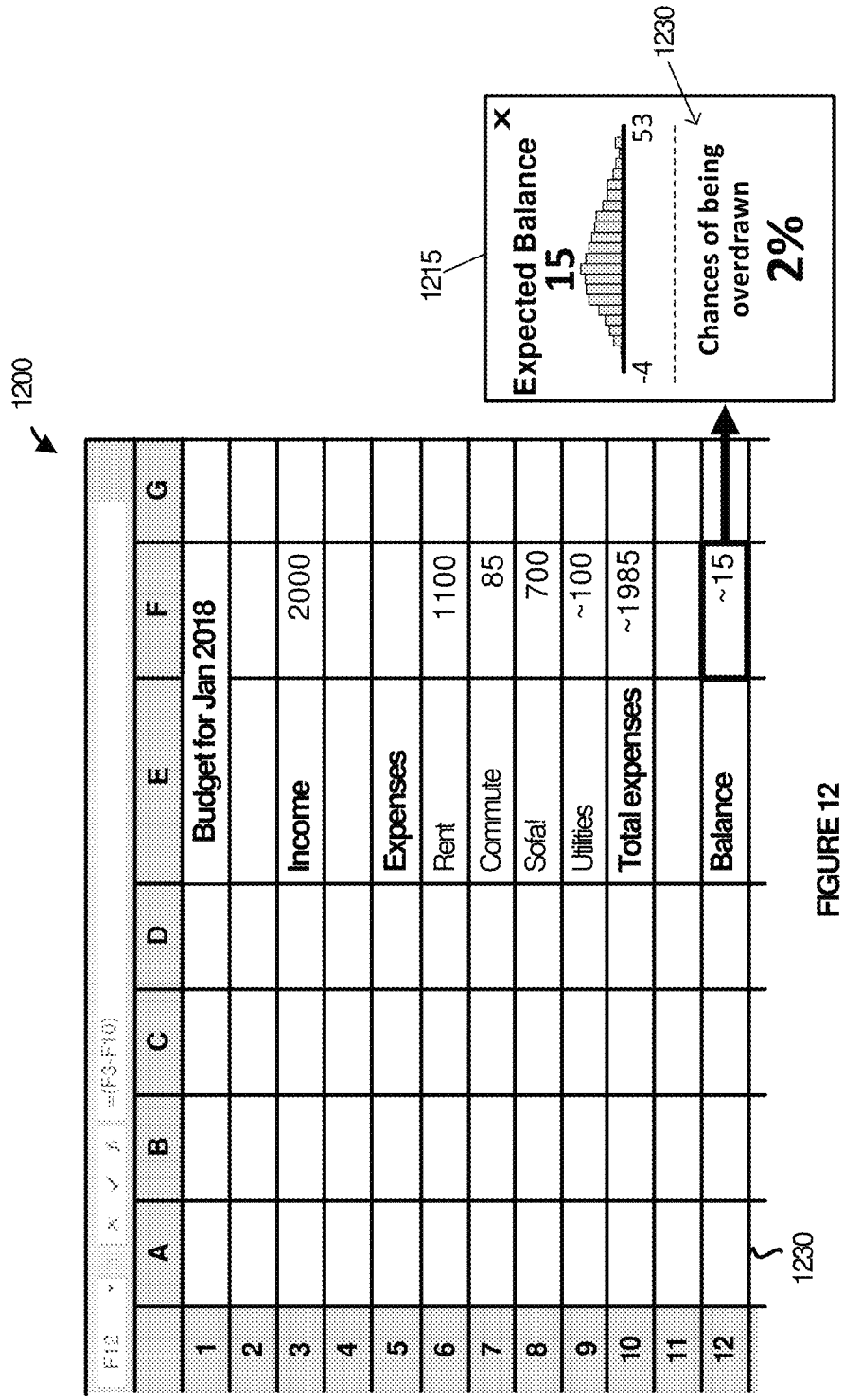
FIG. 12 depicts spreadsheet including a suggestion (or insight) that can be automatically generated by a spreadsheet application, according to some implementations.

FIG. 12 depicts spreadsheet 1230 including a suggestion (or insight) 1230 that can be automatically generated by a spreadsheet application, according to some implementations. More specifically, the suggestion (or insight) 1230 can be automatically generated to automatically identify the likelihood of some meaningful event, e.g., a probability that the balance of the example budget calculation is a negative value. The spreadsheet application may be spreadsheet application 103 of FIG. 1, although alternative configurations are possible. The suggestion (or insight) 1230 can be generated by one or more components of the approximate value handling component 110 of FIG. 1, or one or more processors, extensions, modules, engines, components or tools associated therewith. Alternative configurations are also possible.

FIG. 13 depicts spreadsheet 1330 including a spreadsheet calculation where graphical representations of the approximate values and a probability distribution are rendered directly in individual cells of the spreadsheet, according to some implementations. More specifically, the spreadsheet calculation illustrates a calculation of compound interest with uncertainty. Cells E4:E7 hold an approximate (or uncertain) monthly APR. The approximate (or uncertain) value is defined by a formula, e.g., =DIST.TRIANG(0,0.2, 0.1), which denotes a triangular distribution with minimum value 0, maximum value 0.2, and most likely value 0.1.

As shown in the example of FIG. 13, each cell uses text and a visual representation (or image) of the triangular distribution to represent the uncertain value. The text refers to a 95% confidence interval around the median (mid) point. The visual image is a histogram of samples from the distribution used to represent the uncertain value. As discussed herein, uncertainty propagates. Therefore, cell G4 holds a formula to compute the interest at rate E4 on the value in C4. When calculating this formula, the uncertainty in E4 is taken into account so that the value in G4 is an uncertain value with median 8.27.

As discussed herein, the approximate (or uncertain) values propagate through a spreadsheet calculation. For example, if a user inserts (or through programmatic input) an uncertain value into a cell, the uncertainty propagates to all the cells dependent on the value of that cell.

Figure 14:
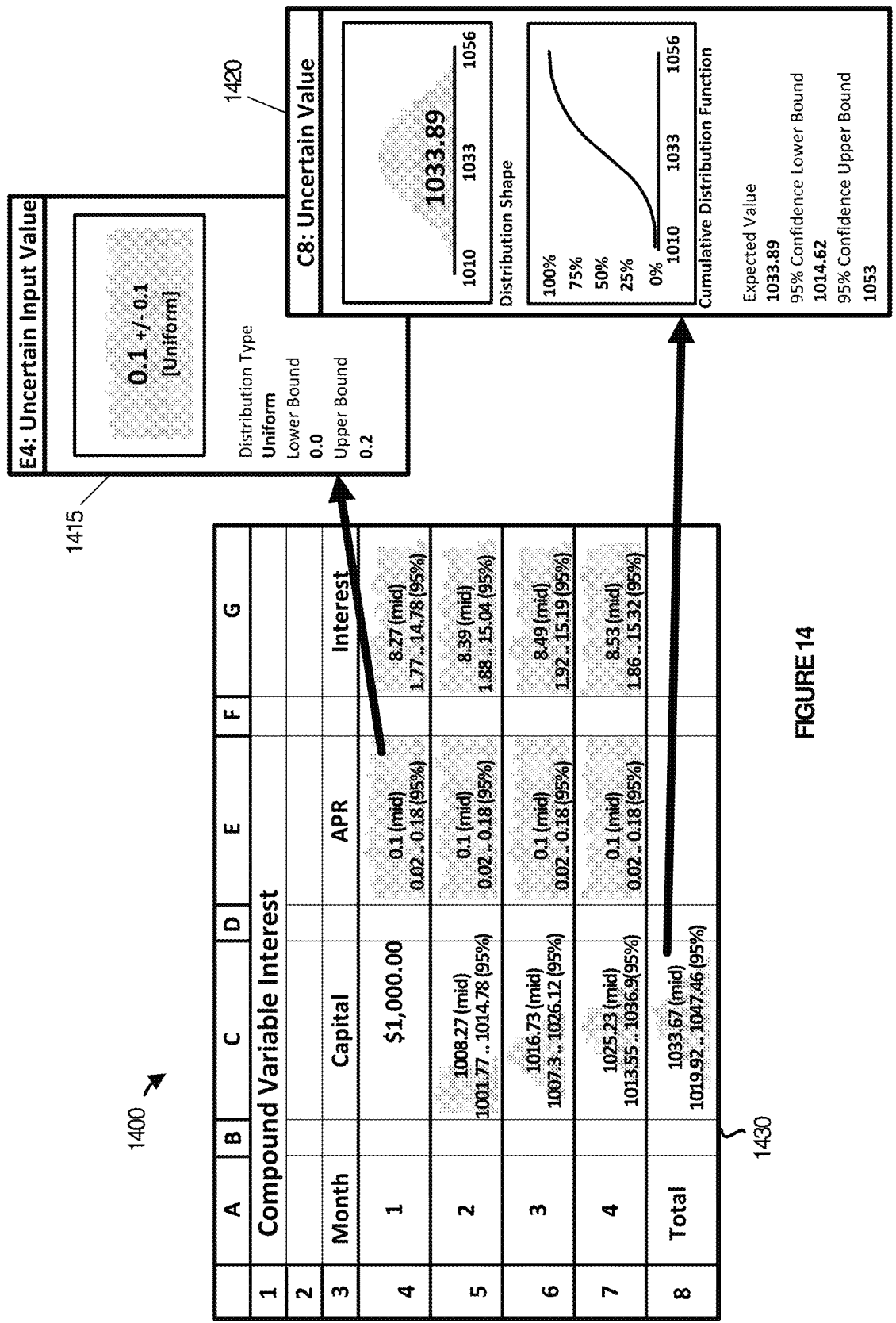
FIG. 14 depicts spreadsheet including a spreadsheet calculation where graphical representations of approximate values are rendered directly in individual cells, according to some implementations.

FIG. 14 depicts spreadsheet 1430 including a spreadsheet calculation where graphical representations of approximate values are rendered directly in individual cells, according to some implementations. More specifically, the example of FIG. 14 illustrates use of cards to input and display approximate (or uncertain) values within the spreadsheet.

Like the example of FIG. 13, the spreadsheet calculation of FIG. 14 illustrates a calculation of compound interest with uncertainty. Cells E4:E7 hold an approximate (or uncertain) monthly APR. However, the approximate (or uncertain) values shown in FIG. 14 are defined by different distribution types.

In some implementations, one or more cards can be attached to each cell of the spreadsheet 1430. As shown in the example of FIG. 14, card 1415 is attached to cell E4 and card 1420 is attached to cell C8. The cards can include various fields that can be edited by a user. For example, card 1415 includes a field to define the distribution type (or family) and various additional fields defining distribution parameters (e.g., upper and lower bounds). Cell E4 has a 'uniform' distribution type with a lower bound of 0.0 and an upper bound of 0.2. Card 1315 also shows a histogram of the distribution to aid in the user's understanding of the uncertainty.

As shown in the example of FIG. 14, card 1420 is attached to the final total in cell C8 and illustrates a histogram, a cumulative distribution function ("S-curve"), and statistics (expected value, and upper and lower bound of the 95% confidence interval). Other fields are also possible.

Figure 15:
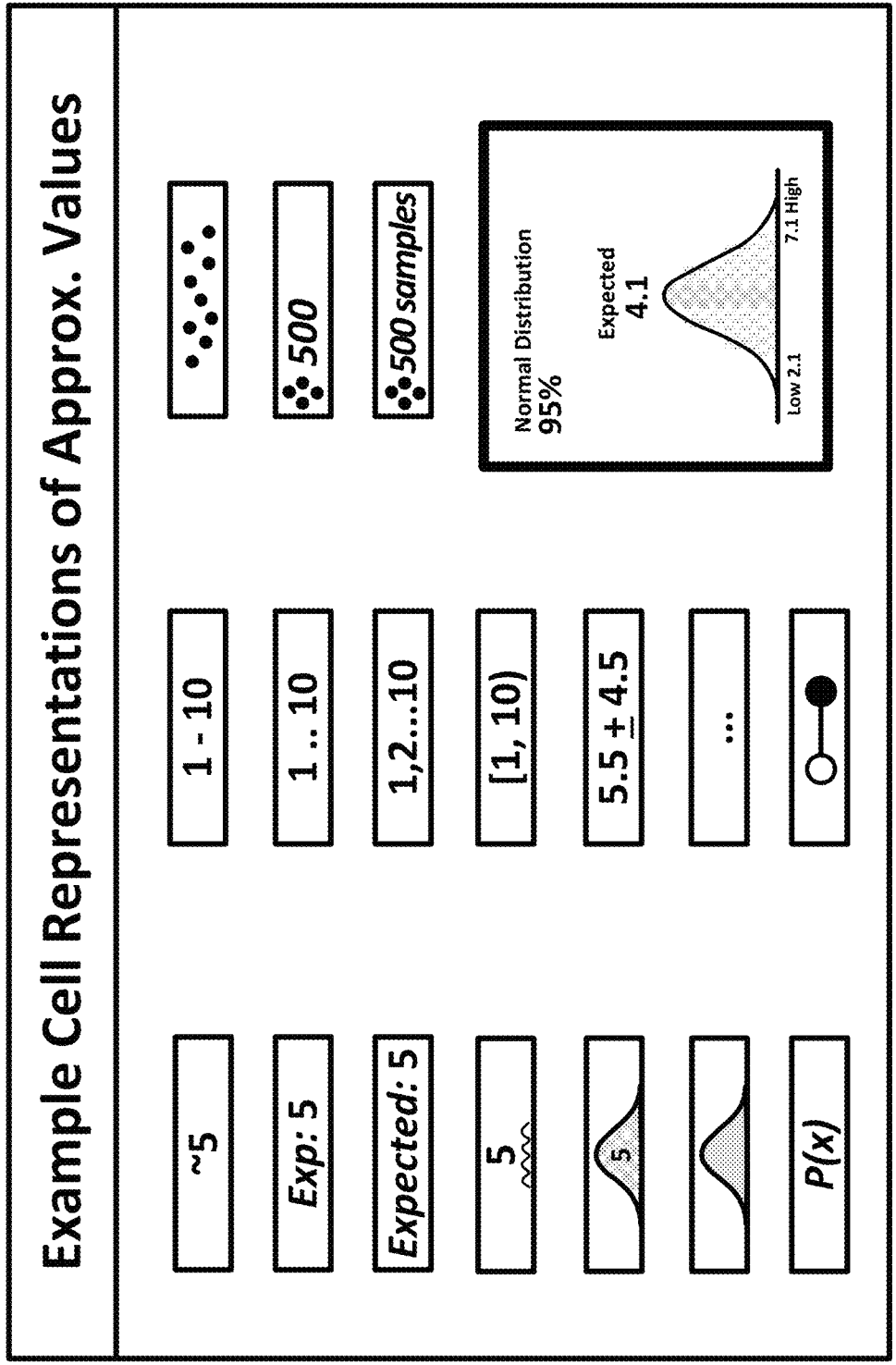
FIG. 15 depicts various cell-level representations of approximate (or uncertain) values, according to some implementations.

FIG. 15 depicts various cell-level representations of approximate (or uncertain) values, according to some implementations. As discussed herein, the rendering of an approximate (or uncertain) value of a cell indicates that the cell contains an approximate (or uncertain) value. The cell formatting can indicate an approximate value in several ways, including: a "~" sign, a bevel in the corner, or an icon). Alternatively or additionally, the cell formatting can include displaying an average (several kinds of averages can be shown, with the usual arithmetic mean being the default). The renderings shown in FIG. 15 show various additional possibilities that are generally self-explanatory and, therefore, are not discussed in greater detail.

The user can choose which of these views applies, both in cards and cells. Styles might be one version of this, where user can pick representation from a gallery of options. Some styles could include simple representations (e.g., "~90") while others could be more complex with a histogram and other representations of the values. The choice of view can also be determined dynamically by cell sizing and scaling, both on user action and automatic action, for when we want to show more data in the cell representation. The choice of view might also be determined based on the inferred expertise level of the user. The same principle can also apply to Card user interfaces (UIs).

Figure 16:
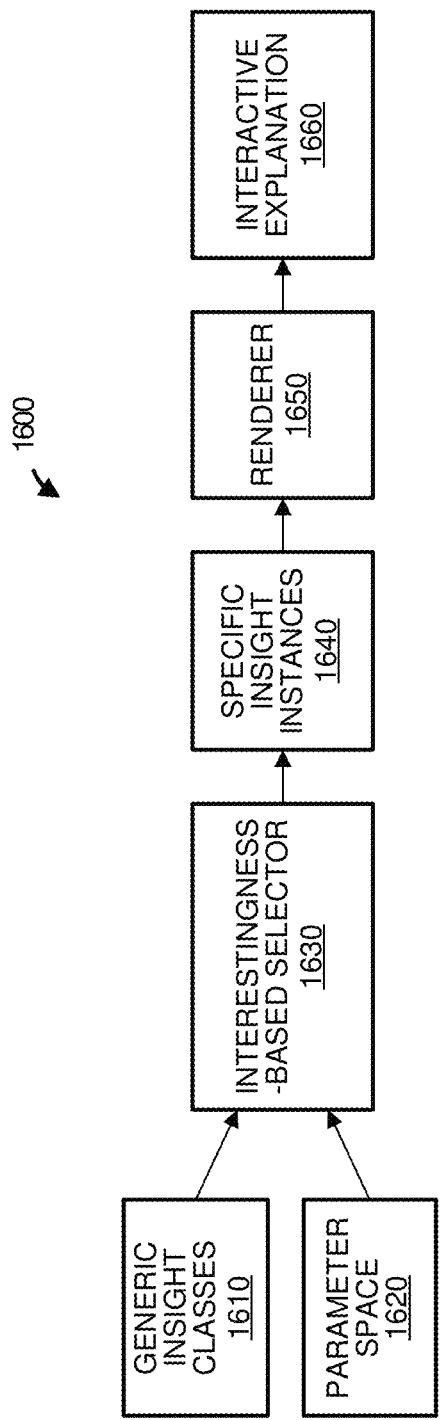
FIG. 16 depicts a block diagram illustrating example operational components of an insights and recommender system, according to some implementations.

FIG. 16 depicts a block diagram illustrating example operational components of an insights and recommender system 1600, according to some implementations. As shown in the example of FIG. 16, the example operational components include a generic insight classes module 1610, a parameter space module 1620, an interestingness-based selector module 1630, a specific insight instances module 1640, a render 1650, and an interactive explanation module 1660. The insights and recommender system 1600 can be insights engine 117 of FIG. 1, although alternative configurations are possible.

In operation, the insights and recommender system 1600 can generate and render insights or recommendations in a spreadsheet. The insights and recommender system 1600 can provide the insights in a number of ways, e.g., through interactive visualisations, alternative representations (e.g., Venn diagrams, natural frequency diagrams, etc.), natural language explanations, etc. In some implementations, the insights and recommender system 1600 examines a distribution and presents a series of insights in the form of charts/graphics with accompanying explanations. In some implementations, the insights and recommender system 1600 can leverage user profiles and past actions, learn from similar users' selections, and learn types of insights that best fit the data/distribution.

The generic insight classes module 1610 includes generic insight classes which can be obtained from various sources. For example, a database of generic insight classes can be built and maintained. In some instances, the generic insight classes can be crowdsourced, or a self-updating database using machine learning can be created and utilized.

The interestingness-based selector 1630 determines the instances that are most interesting to the user. For example, the interestingness-based selector 1630 can generate hand-coded heuristics, including contextually-inferred importance (e.g., when comparing values to other cells in the spreadsheet, the interestingness-based selector 1630 can select instances that seem more important based on font, placement, etc.) or use machine learning to determine what is interesting to the user through their (or similar users) interaction history and/or other interactions with the system.

The render 1650 and interactive explanation module 1660 can depict various cell-level representations of the approximate (or uncertain) values and provide additional details to users as needed, according to some implementations. Example renderings are shown and discussed in greater detail with reference to FIG. 17.

Figure 17:
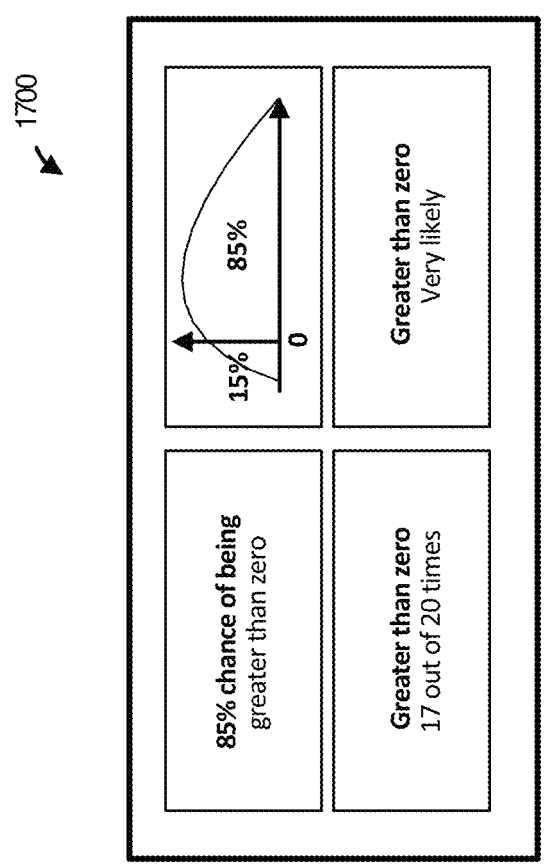
FIG. 17 depicts various cell-level representations of approximate (or uncertain) values, according to some implementations.

FIG. 17 depicts various cell-level representations of approximate (or uncertain) values, according to some implementations. For example, in some implementations, the insights and recommender system 1600 of FIG. 16 takes the most interesting insight instances and picks an appropriate visualisation, e.g., "The probability of this cell being greater than zero is 85%" could be rendered in many ways:" The example of FIG. 17 could be surfaced to the user and a user can then select an appropriate rendering.

FIG. 18 depicts a computing system 1801, which is representative of any system or collection of systems in which the various applications, services, scenarios, and processes disclosed herein may be implemented. Examples of computing system 1801 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 1801 may be implemented as a single apparatus, system, or device or may be implemented in a distributed manner as multiple apparatuses, systems, or devices. Computing system 1801 includes, but is not limited to, processing system 1802, storage system 1803, software 1805, communication interface system 1807, and user interface system 1809. Processing system 1802 is operatively coupled with storage system 1803, communication interface system 1807, and user interface system 1809 (optional).

Processing system 1802 loads and executes software 1805 from storage system 1803. Software 1805 includes various processes, which are generally representative of the processes discussed with respect to the preceding Figures and additional examples below. When executed by processing system 1802, software 1805 directs processing system 1802 to operate as described herein for at least the various processes, operational scenarios, and sequences discussed in the foregoing implementations. Computing system 1801 may optionally include additional devices, features, or functionality not discussed for purposes of brevity.

Referring still to FIG. 18, processing system 1802 may comprise a micro-processor and other circuitry that retrieves and executes software 1805 from storage system 1803. Processing system 1802 may be implemented within a single processing device but may also be distributed across multiple processing devices or sub-systems that cooperate in executing program instructions. Examples of processing system 1802 include general purpose central processing units, application specific processors, and logic devices, as well as any other type of processing device, combinations, or variations thereof.

Storage system 1803 may comprise any computer readable storage media readable by processing system 1802 and capable of storing software 1805. Storage system 1803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 1803 may also include computer readable communication media over which at least some of software 1805 may be communicated internally or externally. Storage system 1803 may be implemented as a single storage device but may also be implemented across multiple storage devices or sub-systems co-located or distributed relative to each other. Storage system 1803 may comprise additional elements, such as a controller, capable of communicating with processing system 1802 or possibly other systems.

Software 1805 may be implemented in program instructions and among other functions may, when executed by processing system 1802, direct processing system 1802 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1805 may include additional processes, programs, or components, such as operating system software, virtual machine software, or other application software, in addition to or that include the processes discussed herein. Software 1805 may also comprise firmware or some other form of machine-readable processing instructions executable by processing system 1802.

In general, software 1805 may, when loaded into processing system 1802 and executed, transform a suitable apparatus, system, or device (of which computing system 1801 is representative) overall from a general-purpose computing system into a special-purpose computing system for handing approximate values in spreadsheet applications. Indeed, encoding software 1805 on storage system 1803 may transform the physical structure of storage system 1803. The specific transformation of the physical structure may depend on various factors in different implementations of this description. Examples of such factors may include, but are not limited to, the technology used to implement the storage media of storage system 1803 and whether the computer-storage media are characterized as primary or secondary storage, as well as other factors.

For example, if the computer readable storage media are implemented as semiconductor-based memory, software 1805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1809 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1809. In some cases, the input and output devices may be combined in a single device, such as a display capable of displaying images and receiving touch gestures. The aforementioned user input and output devices are well known in the art and need not be discussed at length here.

User interface system 1809 may also include associated user interface software executable by processing system 1802 in support of the various user input and output devices discussed above. Separately or in conjunction with each other and other hardware and software elements, the user interface software and user interface devices may support a graphical user interface, a natural user interface, or any other type of user interface.

Communication between computing system 1801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The techniques discussed herein can be embodied as special-purpose hardware (e.g., circuitry), as programmable circuitry appropriately programmed with software and/or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiment shown," "in other embodiments," "in some implementations," "according to some implementations," "in the implementation shown," "in other implementations," and the like generally mean the particular feature, structure, or characteristic following the phrase is included in at least one embodiment or implementation of the present technology and may be included in more than one embodiment or implementation. In addition, such phrases do not necessarily refer to the same or different embodiments or implementations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. An apparatus comprising:
    one or more computer readable storage media;
    program instructions stored on the one or more computer readable storage media including a plurality of components of a spreadsheet application, the components including a value handling component that, when executed by one or more processing systems, directs the one or more processing systems to:
    detect that a cell of a grid-based spreadsheet is populated with one or more values entered as a range of data;
    generate, using a translation model, a set of values representative of the one or more values; and
    replace, in the cell of the grid-based spreadsheet, the one or more values with a direct rendering of a graphical representation of the set of values.

2. The apparatus of claim 1, wherein the program instructions, when executed by the one or more processing systems, further direct the one or more processing systems to:
    identify at least one value of the set of values; and
    render, in the cell of the grid-based spreadsheet, the at least one value of the set of values and an indication that the at least one value of the set of values represents an approximate value for the cell of the grid-based spreadsheet.

3. The apparatus of claim 2, wherein to identify the at least one value of the set of values the program instructions, when executed by the one or more processing systems, further direct the one or more processing systems to identify a median value of the set of values.

4. The apparatus of claim 1, wherein the program instructions, when executed by the one or more processing systems, further direct the one or more processing systems to:
    determine, based at least in part on the translation model, a probability distribution associated with the set of values.

5. The apparatus of claim 4, wherein the program instructions, when executed by the one or more processing systems, further direct the one or more processing systems to:
    render, in the cell of the grid-based spreadsheet, a visual representation of the probability distribution.

6. The apparatus of claim 1, wherein the program instructions, when executed by the one or more processing systems, further direct the one or more processing systems to:

automatically propagate the one or more values downstream through a spreadsheet calculation using a single grid.

7. The apparatus of claim 6, wherein to automatically propagate the one or more values downstream through the spreadsheet calculation, the program instructions, when executed by the one or more processing systems, further direct the one or more processing systems to:
identify a formula expressed in a different cell of the grid-based spreadsheet that depends on the one or more values;
calculating, based at least on the set of values, an output of the formula,
wherein the output comprises a different set of values representative of a different one or more values; and
storing the different set of values as a value of the different cell of the grid-based spreadsheet.

8. The apparatus of claim 7, wherein the program instructions, when executed by the one or more processing systems, further direct the one or more processing systems to:
identify at least one value of the different set of values; and
render, in the different cell of the grid-based spreadsheet, the at least one value of the different set of values and an indication that the at least one value of the different set of values represents an approximate value for the different cell of the grid-based spreadsheet.

9. The apparatus of claim 1, wherein the program instructions, when executed by the one or more processing systems, further direct the one or more processing systems to:
estimate a cost to propagate the one or more values downstream through a spreadsheet calculation using a single grid.

10. The apparatus of claim 1, wherein the program instructions, when executed by the one or more processing systems, further direct the one or more processing systems to generate the translation model based, at least in part, on a surrounding context of the grid-based spreadsheet.

11. The apparatus of claim 1, wherein the program instructions, when executed by the one or more processing systems, further direct the one or more processing systems to select the translation model based, at least in part, on an input.

12. The apparatus of claim 1, wherein the program instructions, when executed by the one or more processing systems, further direct the one or more processing systems to:
monitor an interaction with the grid-based spreadsheet;
detect an uncertainty event related to one or more cells of the grid-based spreadsheet based on the interaction with the grid-based spreadsheet; and
responsively render, on a surface of the grid-based spreadsheet, a graphical user interface.

13. The apparatus of claim 12, wherein the graphical user interface is configured to enable support for the one or more values in the grid-based spreadsheet.

14. The apparatus of claim 12, wherein the graphical user interface enables presentation of a notification that the one or more values are supported in the grid-based spreadsheet.

15. The apparatus of claim 12, wherein the program instructions, when executed by the one or more processing systems, further direct the one or more processing systems to:
select or modify, based at least on an input through the graphical user interface, a distribution type or a parameter associated with the distribution type.

16. The apparatus of claim 1, wherein the program instructions, when executed by the one or more processing systems, further direct the one or more processing systems to:
automatically generate, based at least on one or more values of a spreadsheet calculation, an insight or recommendation; and
render, on a surface of the grid-based spreadsheet via a graphical user interface, the insight or recommendation.

17. A method for handling approximate values in spreadsheets, the method comprising:
receiving input for a value of a cell of a spreadsheet and an indication that the input represents a range of data;
translating, using a translation model, the range of data into a set of values representative of the range of data; and
replacing, in the cell of the spreadsheet, the value of the cell of the spreadsheet with a direct rendering of a graphical representation of the set of values.

18. The method of claim 17, further comprising:
identifying at least one value of the set of values; and
rendering, in the cell of the spreadsheet, the at least one value of the set of values and an indication that the at least one value represents an approximate value for the cell.

19. The method of claim 17, further comprising automatically propagating the range of data downstream through a spreadsheet calculation using a single grid by:
identifying a formula expressed in a different cell of the spreadsheet that depends on the the value of the cell of the spreadsheet;
calculating, based at least on the set of values, an output of the formula,
wherein the output comprises a different set of values representative of a different range of data; and
storing the output as a value of the different cell of the spreadsheet.

20. An apparatus comprising:
one or more processing systems;
one or more computer readable storage media;
program instructions stored on the one or more computer readable storage media that, when executed by one or more processing systems, direct the one or more processing systems to:
receive input for a value of a cell of a spreadsheet, wherein the input represents a range of data;
populate the value of the cell of the spreadsheet with one or more values that represent the range of data;
detect a translation model with which to evaluate the one or more values that represent the range of data;
generate, using the translation model, a set of values representative of the one or more values that represent the range of data;
store the set of values as the value for the cell of the spreadsheet; and
replace, in the cell of the spreadsheet, the value of the cell of the spreadsheet with a direct rendering of a graphical representation of the set of values that represent the range of data.

* * * * *